(12) United States Patent
Park

(10) Patent No.: US 10,696,905 B2
(45) Date of Patent: Jun. 30, 2020

(54) PRESSURE-CONTROLLED OIL REFINING DEVICE

(71) Applicant: Yongil Park, Gyeonggi-Do (KR)

(72) Inventor: Yongil Park, Gyeonggi-Do (KR)

( * ) Notice: Subject to any disclaimer, the term of this patent is extended or adjusted under 35 U.S.C. 154(b) by 22 days.

(21) Appl. No.: 15/775,909

(22) PCT Filed: Nov. 3, 2016

(86) PCT No.: PCT/KR2016/012560
§ 371 (c)(1),
(2) Date: May 14, 2018

(87) PCT Pub. No.: WO2017/122913
PCT Pub. Date: Jul. 20, 2017

(65) Prior Publication Data
US 2018/0327672 A1    Nov. 15, 2018

(30) Foreign Application Priority Data

Jan. 12, 2016   (KR) .................. 10-2016-0003548

(51) Int. Cl.
*C10G 7/00* (2006.01)
*B01D 3/14* (2006.01)
(Continued)

(52) U.S. Cl.
CPC ............ *C10G 7/00* (2013.01); *B01D 1/0017* (2013.01); *B01D 3/14* (2013.01); *B01D 5/006* (2013.01); *B01D 5/009* (2013.01); *B01D 5/0081* (2013.01); *C10G 1/02* (2013.01); *C10G 1/10* (2013.01); *C10G 7/006* (2013.01); *C10G 2300/1003* (2013.01); *C10G 2300/1007* (2013.01);
(Continued)

(58) Field of Classification Search
CPC .. C10G 7/00; C10G 2300/1007; C10G 7/006; C10G 1/10; C10G 1/02; C10G 2400/06; C10G 2400/04; C10G 2400/02; C10G 2300/4012; C10G 2300/1003; B01D 5/009; B01D 5/0081; B01D 5/006; B01D 3/14; B01D 1/0017
See application file for complete search history.

(56) References Cited

U.S. PATENT DOCUMENTS

2008/0296205 A1*  12/2008  Kohara ................ C08J 11/12
208/179

FOREIGN PATENT DOCUMENTS

KR    10-2004-0022642 A    3/2004
KR    10-2004-0067266 A    7/2004
(Continued)

*Primary Examiner* — Randy Boyer
*Assistant Examiner* — Juan C Valencia
(74) *Attorney, Agent, or Firm* — Heedong Chae; Lucem, PC

(57) ABSTRACT

The present invention relates to a pressure-controlled oil refining device for refining oil from liquid-state oil waste. The purpose of the present invention is to provide a pressure-controlled oil refining device wherein: liquid-state oil waste is introduced and then heated such that, as the pressure rises, the vaporized fluid (oil+impurities) is transferred in the upward direction; a pressure valve is opened/closed such that the oil and impurities can be separated from the fluid and then discharged; the oil is condensed by a cooler such that the same can be liquefied again and stored; and the oil can be refined from the oil waste and reused.

3 Claims, 3 Drawing Sheets

(51) Int. Cl.
     *C10G 1/02*           (2006.01)
     *C10G 1/10*           (2006.01)
     *B01D 1/00*          (2006.01)
     *B01D 5/00*          (2006.01)

(52) U.S. Cl.
     CPC . *C10G 2300/4012* (2013.01); *C10G 2400/02* (2013.01); *C10G 2400/04* (2013.01); *C10G 2400/06* (2013.01)

(56) References Cited

FOREIGN PATENT DOCUMENTS

| KR | 10-2007-0044748 A | 4/2007 |
| KR | 10-2007-0111054 A | 11/2007 |
| KR | 10-2011-0096928 A | 8/2011 |

\* cited by examiner

PRESSURE-CONTROLLED OIL REFINING DEVICE

CROSS-REFERENCE TO RELATED APPLICATION

This application claims the benefit of Korean Application No. 10-2016-0003548 filed on Jan. 12, 2016 with the Korean Intellectual Property Office, the disclosure of which is incorporated herein by reference.

TECHNICAL FIELD

The present invention relates to a pressure control type oil refining device, and more particularly, to a pressure control type oil refining device, which is capable of separating gasoline or diesel from liquid-state oil waste, in which various things are mixed, by a valve control according to the boiling point and pressure depending on heating temperature, refining the separated gasoline or diesel, and recycling the refined gasoline or diesel.

BACKGROUND ART

In general, waste materials mean things that are used and lose material values in human life. Such waste materials except recyclable things are disposed in the ways of landfill, incineration, and intermediate treatment.

Here, incineration is one of intermediate treatment processes of the waste management system and belongs to a chemical method. Because incineration can reduce volume by about 95% to 99% and weight by about 80% to 85% compared with landfill of waste and save a landfill space, incineration is an effective and sustainable waste disposal method. Additionally, the allotment ratio in disposal of waste is gradually increasing because incineration has economic feasibility that thermal energy is recovered. However, incineration has a disadvantage in that it must have a pollution control facility because it generates cause substances of air pollution and soil pollution.

Moreover, physiochemical treatment aims to separate waste from water insoluble in wastewater, and can reduce load and remove solid materials.

Furthermore, in case of solidification treatment, when a worker mixes waste and cement together and pours water, a lump hardened by hydration is made in a certain period of time. The solidification treatment can maximize delay of speed that harmful ingredients, such as heavy metals, move and permeate since the waste is locked in the solid cement.

In the meantime, petroleum is an important source accounting for one third of energy sources used around the world, and most of products or goods including plastic are made using petroleum.

That is, there are lots of products and goods made using gasoline or diesel, but such products and goods become waste materials if they lose material values after being used.

For instance, such used products may become hydrocarbon-based organic waste, such as waste plastic or waste oil.

However, it is natural that such waste materials are recycled from a viewpoint of the recycling of resources, but there are a lot of difficulties in recycling of such hydrocarbon-based organic waste.

DISCLOSURE

Technical Problem

Accordingly, the present invention has been made in view of the above-mentioned problems occurring in the prior art, and it is an object of the present invention to provide a pressure control type oil refining device, which is capable of separating gasoline or diesel from liquid-state oil waste, in which various things are mixed, by a valve control according to the boiling point and pressure depending on heating temperature, refining the separated gasoline or diesel, and recycling the refined gasoline or diesel.

It is another object of the present invention to provide 8 pressure control type oil refining device, which can separate and refine tall oil, gasoline or diesel from liquid-state oil waste according to heating temperature using the point that there are different boiling points according to specific gravity.

It is a further object of the present invention to provide a pressure control type oil refining device, which can separate and recycle gasoline or diesel from liquid-state oil waste, separate gas from the refined oil and recycle the gas for butane gas, and enhance recycling efficiency of the liquid-state oil waste.

Technical Solution

To accomplish the above object, according to the present invention, there is provided a pressure control type oil refining device for refining oil from liquid-state oil waste obtained by heating waste materials from the outside, including: a heating furnace used for heating the oil waste therein; a fluid transfer tube mounted to stand erect and communicatingly connected to an upper part of the heating furnace, the fluid transfer tube for upwardly transferring fluids, which contains vaporized oil ingredients and impurities separated from the oil waste depending on pressure rising by heating inside the heating furnace; oil discharge tubes located at one side of an upper end part of the fluid transfer tube and communicatingly connected to the fluid transfer tube, a plurality of the oil discharge tubes being distributed on the same plane and refining oils out of the fluids upwardly transferred through the fluids transfer tube and sorting and discharging the oils by kinds of oil ingredients; impurity discharge tubes located at the other side of an upper end part of the fluid transfer tube and communicatingly connected to the fluid transfer tube, a plurality of the impurity discharge tubes being distributed on the same plane and separating and discharging impurities from the fluids upwardly transferred through the fluid transfer tube; pressure valves for refining oil respectively connected to connection parts between the fluid transfer tube and the oil discharge tubes, opened and closed depending on pressure formed in the fluid transfer tube, and used to sort and refine oils; pressure valves for discharging impurities respectively connected to connection parts between the fluid transfer tube and the impurity discharge tubes, opened and closed depending on pressure formed in the fluid transfer tube, and used to separate and refine impurities; an oil cooler having cooling tubes, which condense and liquefy oils refined through the oil discharge tubes in order to discharge liquid-state oil; an impurity cooler having cooling tubes for cooling the impurities discharged through the impurity discharge tubes; a refined oil storing part for sorting and storing the liquid-state oils refined after passing the oil cooler; ran impurity storing part for sorting and storing the impurities discharged after passing the impurity cooler; and gas outlets, which is connected to the oil cooler and separately discharges gas contained in the refined oils so that the gas can be recycled.

Moreover, the heating furnace is as electric furnace, which uses electricity as a heat source. The oil discharge tubes and the impurity discharge tubes are arranged to be inclined downwardly from the upper part so that the fluids are discharged easily, and five oil discharge tubes and five impurity discharge tubes are distributed. The pressure valves for refining oil and the pressure valves for discharging impurities are disposed to be operated differently depending on pressure because there is a difference in pressure values for opening and closing the valves, and are arranged at corresponding positions to be opposed to each other so as to provide the same opening and closing actions.

Furthermore, the oil cooler has a temperature controller mounted therein to uniformly maintain temperature of the oil cooler.

Advantageous Effects

As described above, the pressure control type oil refining device according to an embodiment of the present invention can separate gasoline or diesel from liquid-state oil waste, in which various things are mixed, by a valve control according to the boiling point and pressure depending on heating temperature, refine the separated oil, such as gasoline or diesel, recycle the refined gasoline or diesel, and separate oil from impurities and discharge them.

Moreover, the pressure control type oil refining device according to the embodiment of the present invention can enhance effectiveness of the device and treatment efficiency in refining oil because there is no need to wash a tube during operation of the device and the device is operated consecutively, separate gas from the refined oil and recycle the separated gas for butane gas, and use waste residues as fuel because the waste residues remaining in a heating furnace can be used as fuel.

Furthermore, the pressure control type oil refining device according to the embodiment of the present invention can refine and recycle usable oil without disposal, such as incineration or landfill of liquid-state oil waste.

BEST MODEL

Figure 1:
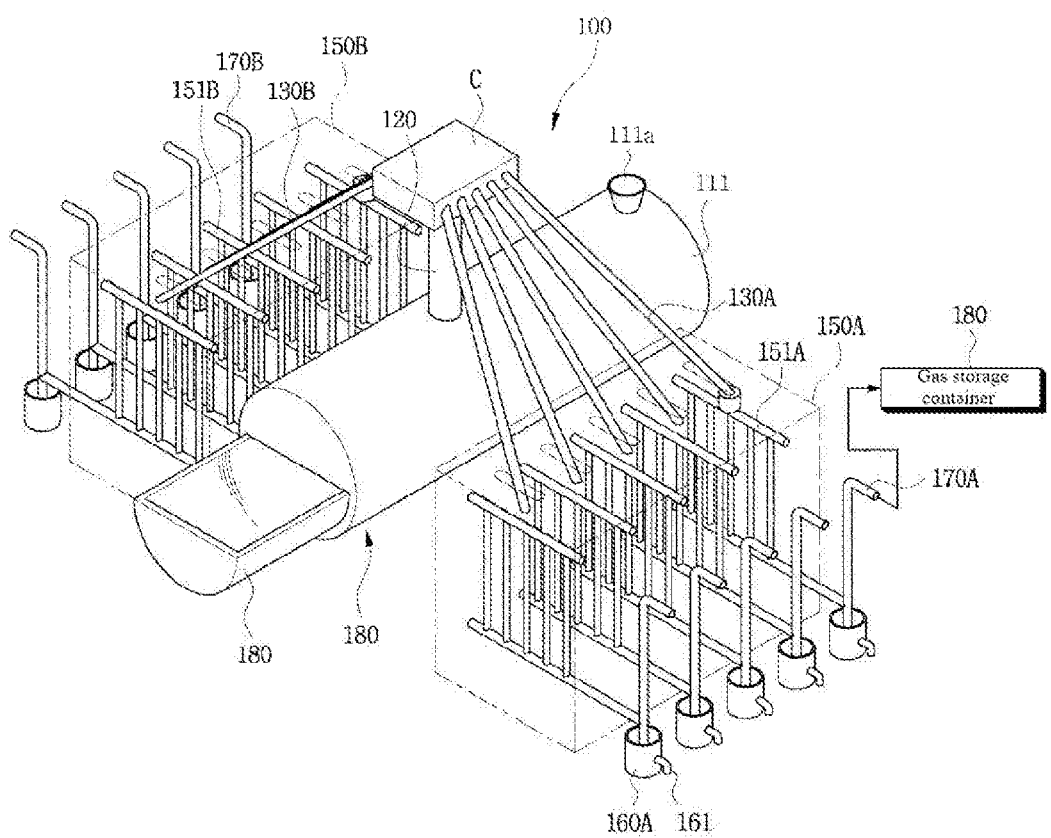
FIG. 1 is a perspective view for showing a pressure control type oil refining device according to an embodiment of the present invention.

A pressure control type oil refining device according to an embodiment of the present invention for refining oil from liquid-state oil waste, which is obtained by heating waste from the outside, includes: a heating furnace 110 used for heating the oil waste therein; a fluid transfer tube 120 mounted to stand erect and communicatingly connected to an upper part of the heating furnace 110, the fluid transfer tube 120 for upwardly transferring fluids, which contains vaporized oil ingredients and impurities separated from the oil waste depending on pressure rising by heating inside the heating furnace 110; oil discharge tubes 130A located at one side of an upper end part of the fluid transfer tube 120 and communicatingly connected to the fluid transfer tube 120, a plurality of the oil discharge tubes 130A being distributed on the same plane and refining oils out of the fluids upwardly transferred through the fluid transfer tube 120 and sorting and discharging the oils by kinds of oil ingredients; impurity discharge tubes 130B located at the other side of an upper end part of the fluid transfer tube 120 and communicatingly connected to the fluid transfer tube 120, a plurality of the impurity discharge tubes 130B being distributed on the same plane and separating and discharging impurities from the fluids upwardly transferred through the fluid transfer tube 120; pressure valves for refining oil 140A respectively connected to connection parts between the fluid transfer tube 120 and the oil discharge tubes 130A, opened and closed depending on pressure formed in the fluid transfer tube 120, and used to sort and refine oils; pressure valves for discharging impurities 140B respectively connected to connection parts between the fluid transfer tube 120 and the impurity discharge tubes 130B, opened and closed depending on pressure formed in the fluid transfer tube 120, and used to separate and refine impurities; an oil cooler 150A having cooling tubes 151A, which condense and liquefy oils refined through the oil discharge tubes 130A in order to discharge liquid-state oil; an impurity cooler 150B having cooling tubes 151B for cooling the impurities discharged through the impurity discharge tubes 130B; a refined oil storing part 160A for sorting and storing the liquid-state oils refined after passing the oil cooler 150A; an impurity storing part 160B for sorting and storing the impurities discharged after passing the impurity cooler 150B; and gas outlets 170A, which is connected to the oil cooler 150A and separately discharges gas contained in the refined oils so that the gas can be recycled.

MODE FOR INVENTION

Reference will be now made in detail to preferred embodiments of the present invention with reference to the attached drawings. Objects, configurations and features of the present invention will be understood better through the detailed description of the present invention.

A pressure control type oil refining device 100 according to a preferred embodiment of the present invention is a device for heating liquid-state oil waste obtained by first heating waste from the outside to refine and recycle oil from the heated oil waste, and adopts fractional distillation using a boiling point difference and a pressure difference according to heating temperature.

In this instance, waste may be waste plastic or waste oil, and liquid-state oil waste obtained through the first heating outside is used.

Figure 2:
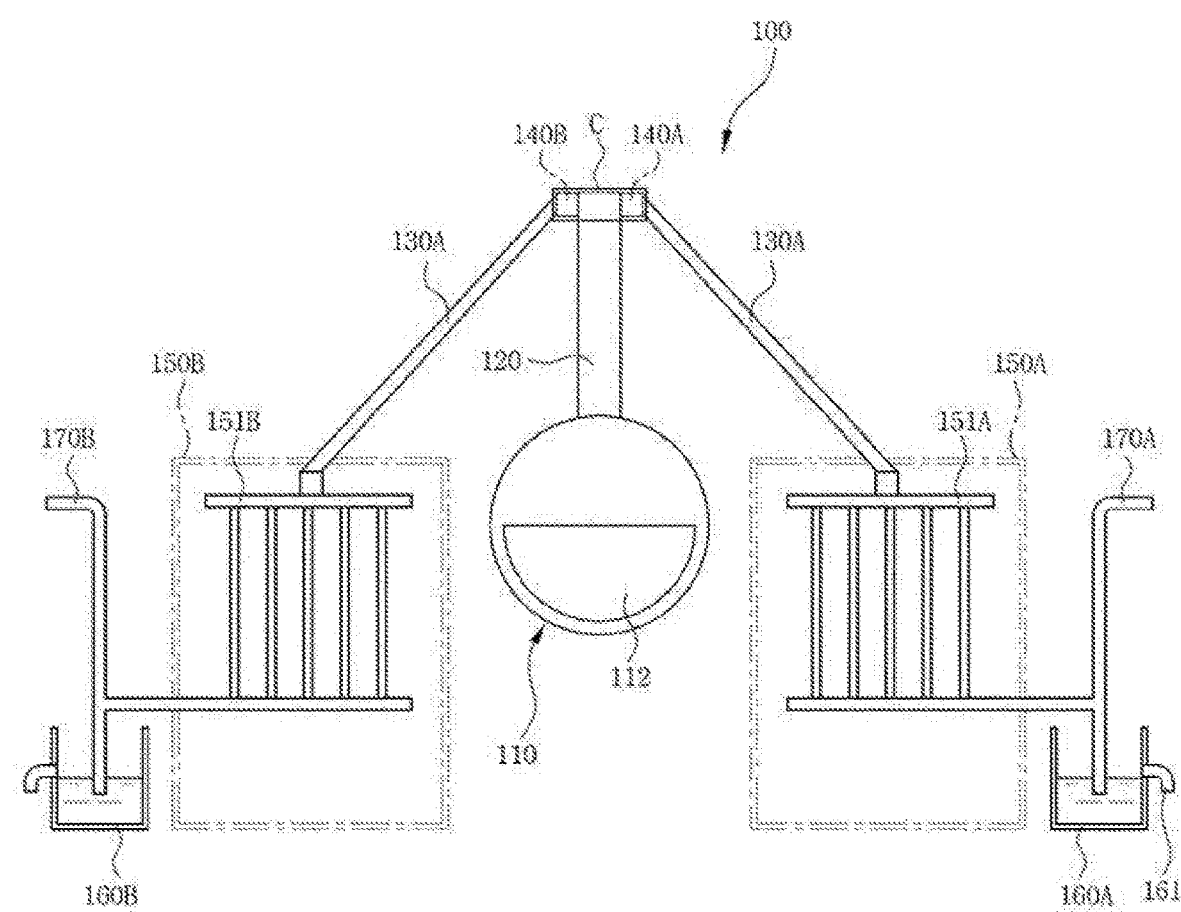
FIG. 2 is a front view showing the pressure control type oil refining device according to the embodiment of the present invention.
Figure 3:
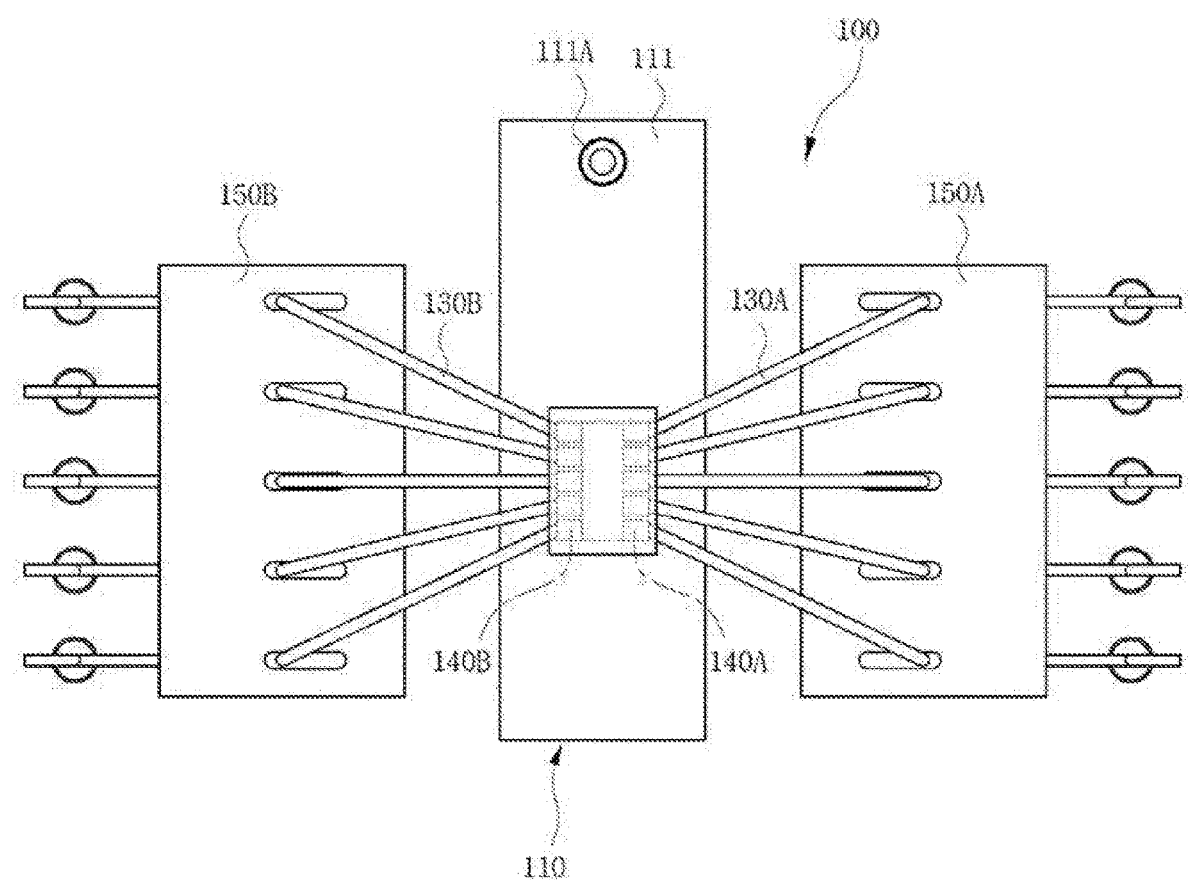
FIG. 3 is a plan view showing the pressure control type oil refining device according to the embodiment of the present invent ion.

That is, the pressure control type oil refining device 100 according to the embodiment of the present invention, as shown in FIGS. 1 to 3, includes a heating furnace 110, a fluid transfer tube 120, oil discharge tubes 130A, impurity discharge tubes 130B, pressure valves for refining oil 140A, pressure valves for discharging impurities 140B, an oil cooler 150A, an impurity cooler 150B, refined oil storing parts 160A, impurity storing parts 160B, and gas outlets 170A, and the components are combined organically.

The heating furnace 110 is used for heating the liquid-state oil waste put therein, and is the most fundamental component for separating oil like gasoline or diesel from the waste using a difference in boiling point according to heating temperature.

In this instance, for the heating furnace 110, in an aspect of convenience, it is the most preferable to use an electric furnace, which uses electricity as a heat source, but the present invention is not limited to the above and other methods which use other heat sources may be also applicable.

Here, preferably, the heating furnace 110 uses and recycles waste residues remaining in the heating furnace after refining the oil waste.

In other words, the heating furnace 110 includes a furnace body 111, and a waste accommodating part 112, which does not interrupt sealability of the furnace body 111, is inserted into and drawn out of the furnace body 111, and has an accommodating space for accommodating oil waste.

Here, the heating furnace 110 has a waste inlet 111a formed, at an upper part of the furnace body 111 so that the liquid-state oil waste can be put into the heating furnace 110 even though the waste accommodating part 112 is not drawn out of the furnace body 111. Additionally, preferably, a sealing cover is formed to maintain sealability of the furnace body 111 after waste is put.

The fluid transfer tube 120 is mounted such that one end is connected to an upper part of the heating furnace 110 to be communicated with the inside of the heating furnace, and is a tube body mounted to stand erect.

In this instance, the fluid transfer tube 120 raises pressure according to heating temperature formed inside the heating furnace 110, and serves to transfer fluid, which contains vaporized oil and impurities separated from the liquid-state oil waste, in the upward direction by a boiling point difference inside the heating furnace 110.

The oil discharge tube 130A is a tube body which is located at one side of an upper end portion of the fluid transfer tube 120 and is connected to the fluid transfer tube 120 to communicate with the fluid transfer tube 120, and a plurality of oil discharge tubes 130A are distributed and mounted on the same plane.

In this instance, because a plurality of the oil discharge tubes 130A are distributed, the pressure control type oil refining device 100 can refine oil out of fluids transferred in the upward direction through the fluid transfer tube 120 and sort and discharge the refined oil according to kinds of oil ingredients.

Here, preferably, the oil discharge tubes 130A are arranged to be inclined downwardly from the upper part in order to easily discharge the refined oil and provide efficiency in connection with the oil cooler 150A.

Moreover, preferably, five oil discharge tubes 130A are distributed on the same plane in order to separate and discharge oils like gasoline and diesel, which have a difference in boiling point, from the oil waste.

The impurity discharge tube 130B is located at the other side of the upper end portion of the fluid transfer tube 120 to be communicatingly connected with the fluid transfer tube 120, and a plurality of the impurity discharge tubes 130B are distributed on the same plane.

In this instance, the impurity discharge tubes 130B separate and discharge impurities from the fluids transferred in the upward direction through the fluid transfer tube 120.

Here, preferably, the impurity discharge tubes 130B and the oil discharge tubes 130A are mounted to correspond with each other in the same number and location.

That is, because the impurity discharge tubes 130B and the oil discharge tubes 130A are formed individually and are distributed, the pressure control type oil refining device 100 has several advantages in that there is no need to wash the tubes during the processes of refining, separating and discharging oil from the oil waste and in that the device is operated in consecutive work to provide effectiveness.

Furthermore, in order to apply the distribution installation structure to the oil discharge tubes 130A and the impurity discharge tubes 130B, a box type structure like a case C may be applied to the upper part of the fluid transfer tube 120, and the shape and size of the fluid transfer tube 120 may be changed.

The pressure valves for refining oil 140A are respectively connected to connection parts between the fluid transfer tube 120 and the oil discharge tubes 130A, are disposed to be automatically opened and closed depending on pressure formed in the fluid transfer tube 120 to be used to sort and refine oils from the fluid rising upward.

The pressure valves for discharging impurities 140B are respectively connected to connection parts between the fluid transfer tube 120 and the impurity discharge tubes 130B, are disposed to be automatically opened and closed depending on pressure formed in the fluid transfer tube 120 to be used to separate and refine impurities from the fluid rising upward.

In this instance, the pressure valves for refining oil 140A and the pressure valves for discharging impurities 140B may be disposed in correspondence to the number of the pressure valves for refining oil 140A and the number of the pressure valves for discharging impurities 140B, and are automatically opened when pressure formed inside the fluid transfer tube 120 reaches the range of the set pressure of the valves, and on the contrary, is automatically closed when pressure formed inside the fluid transfer tube 120 is beyond the range of the set pressure of the valves.

Here, because there is a difference in pressure formed inside the fluid transfer tube 120 depending on types of oil waste, the pressure valves 140A and 140B are operated differently depending on pressure due to a difference in pressure values set for opening and closing.

Here, the pressure valves for refining oil 140A and the pressure valves for discharging impurities 140B are disposed such that the valves arranged at corresponding positions to opposed to each other provide the same opening and closing actions.

The oil cooler 150A condenses and liquefies the oil refined through the oil discharge tubes 130A to make and discharge liquid-state oil, and has cooling tubes 151A respectively connected to ends of the oil discharge tubes 130A.

In this instance, the oil cooler 150A is arranged to be bent downwardly relative to end portions of the cooling tubes 151A to easily discharge the liquefied oil so that the liquefied oil can naturally flow into the refined oil storing part 160A.

Here, preferably, oil cooler 150A has a temperature controller therein to uniformly maintain temperature relative to the cooling tubes 151A.

The impurity cooler 150B is to cool impurities discharged through the impurity discharge tubes 130B, and has cooling tubes 151B respectively connected to ends of the impurity discharge tubes 130B.

In this instance, the impurity cooler 150B is arranged to be bent downwardly relative to end portions of the cooling tubes 151B to easily discharge the liquefied oil so that the liquefied oil can naturally flow into the impurity storing part 160B.

The refined oil storing parts 160A respectively have storage containers corresponding to the cooling tubes 151A of the oil cooler 150A to sort and store the refined liquid-state oils discharged after passing the oil cooler 150A.

In this instance, discharge valves 161A are respectively disposed at the storage containers of the refined oil storing parts 160A to discharge out the refined liquid-stage oils of various kinds, such as gasoline or diesel, stored in the storage containers.

The impurity storing parts 160B respectively have storage containers corresponding to the cooling tubes 151B of the impurity cooler 150B to sort and store the impurities discharged after passing the impurity cooler 150B.

The gas outlets 170A are respectively connected to the cooling tubes 151A of the oil cooler 150A, are arranged to be respectively bent upwardly relative to end portions of the cooling tubes 151A, which transfer and discharge the refined oil, and discharge gas included in the refined oil so as to recycle the gas.

In this instance, the gas outlets 170A is connected to a gas storage container 180 in order to send gas to the gas storage container 180.

Now, actions of the pressure control type oil refining device 100 according to the preferred embodiment of the present invention will be described as follows.

First, liquid-state oil waste in which various oil ingredients, such as gasoline or diesel, obtained by first heating waste materials from the outside is put into the heating furnace 110.

After that, the heating furnace 110 is set to a predetermined temperature, and then, is operated to heat.

So, the oil waste is boiled at the predetermined temperature, and then, fractional distillation starts from ingredients, which have lower boiling points, out of the ingredients included in the oil waste.

That is, because of heating, pressure inside the device rises, and oil ingredients separated and vaporized from the oil waste are transferred upwardly through the fluid transfer tube 120 connected to the heating furnace 110.

In this instance, the ingredients of the liquid-state oil waste in which various oil ingredients are mixed are sequentially separated according to the difference in boiling points of the ingredients, are transferred upwardly through the fluid transfer tube 120. Additionally, as pressure inside the device rises, the pressure valves for refining oil 140A and the pressure valves for discharging impurities 140B are automatically opened on all such occasions.

Here, water is first separated from the liquid-state oil waste, in which various oil ingredients are mixed. The water is refined and discharged from the first oil discharge tube 130A, and then, impurities are discharged through the first impurity discharge tube 130B before the second refining is carried out.

Next, tall oil is second separated. The tall oil is refined and discharged from the second oil discharge tube 130A, and then, impurities are discharged through the second impurity discharge tube 130B before the third refining is carried out.

Continuously, gasoline is third separated. The gasoline is refined and discharged from the third oil discharge tube 130A, and then, impurities are discharged through the third impurity discharge tube 130B before the fourth refining is carried out.

Next, diesel is fourth separated. The diesel is refined and discharged from the fourth oil discharge tube 130A, and then, impurities are discharged through the fourth impurity discharge tube 130B before the fifth refining is carried out.

Next, kerosene is fifth separated. The kerosene is refined and discharged from the fifth oil discharge tube 130A, and then, impurities are discharged through the fifth impurity discharge tube 130B.

Here, the pressure valves for refining oil 140A and the pressure valves for discharging impurities 140B are involved in each operation, and are automatically closed when pressure inside the device lowers below the setting range.

As described above, the vaporized oil refined and discharged from the oil discharge tubes 130A pass the oil cooler 150A having the cooling tubes 151A, which are respectively connected to the oil discharge tubes 130A, and in this instance, the refined oil is condensed and liquefied to become liquid-state oil.

Moreover, the impurities discharged from the impurity discharge tubes 130B pass the impurity cooler 150B having the cooling tubes 151B, which are respectively connected to the impurity discharge tubes 130B, and in this instance, the impurities are cooled and discharged.

Furthermore, the liquefied and refined oils passing the cooling tubes 151A of the oil cooler 150A are discharged and stored to the refined oil storing part 160A, and gas contained in the refined oils is discharged out through the gas outlets 170A branching off and connected to the cooling tubes 151A of the oil cooler 150A.

Here, the oils stored in the refined oil storing part 160A are sorted and stored by kinds so as to be recycled.

Here, the gas discharged out together with the refined oils through the gas outlets 170A is transferred and stored to the gas storage container 180, and then, is cooled to be recycled as butane gas. The gas may be cooled without using the gas storage container 180 to be recycled as butane gas.

Furthermore, the impurities passing the cooling tubes 151B of the impurity cooler 150B are discharged and stored to the impurity storing part 160B, and the gas contained in the impurities is separately discharged through the gas outlets 170B to be recycled.

Therefore, the pressure control type oil refining device 100 according to the preferred embodiment of the present invention can recycle 100% of oil waste without disposal treatment of the oil waste, such as incineration or landfill, because the device can use even waste residues remaining in the heating furnace 110 as fuel.

While the present invention has been particularly shown and described with reference to the detailed embodiment thereof, it will be understood by those of ordinary skill in the art that the present invention is not limited to the exemplary embodiment and attached drawings and various changes and modifications may be made therein without departing from the technical idea and scope of the present invention.

INDUSTRIAL APPLICABILITY

The pressure control type oil refining device according to the preferred embodiment of the present invention can separate gasoline or diesel from liquid-state oil waste, in which various things are mixed, by a valve control according to the boiling point and pressure depending on heating temperature, refine the separated gasoline or diesel, and recycle the refined gasoline or diesel.

The invention claimed is:

1. A pressure control type oil refining device for refining oil from liquid-state oil waste obtained by heating waste materials from the outside, the pressure control type oil refining device comprising:
a heating furnace (110) used for heating the oil waste therein;
a fluid transfer tube (120) mounted to stand erect and communicatingly connected to an upper part of the heating furnace (110), the fluid transfer tube (120) for upwardly transferring fluids, which contains vaporized oil ingredients and impurities separated from the oil waste depending on pressure rising by heating inside the heating furnace (110);

oil discharge tubes (130A) located at one side of an upper end part of the fluid transfer tube (120) and communicatingly connected to the fluid transfer tube (120), a plurality of the oil discharge tubes (130A) being distributed on the same plane and refining oils out of the fluids upwardly transferred through the fluid transfer tube (120) and sorting and discharging the oils by kinds of oil ingredients;

impurity discharge tubes (130B) located at the other side of an upper end part of the fluid transfer tube (120) and communicatingly connected to the fluid transfer tube (120), a plurality of the impurity discharge tubes (130B) being distributed on the same plane and separating and discharging impurities from the fluids upwardly transferred through the fluid transfer tube (120);

a first set of pressure valves (140A) respectively connected to connection parts between the fluid transfer tube (120) and the oil discharge tubes (130A), opened and closed depending on pressure formed in the fluid transfer tube (120), and used to sort and refine oils;

a second set of pressure valves (140B) respectively connected to connection parts between the fluid transfer tube (120) and the impurity discharge tubes (130B), opened and closed depending on pressure formed in the fluid transfer tube (120), and used to separate and refine impurities;

an oil cooler (150A) having cooling tubes (151A), which condense and liquefy oils refined through the oil discharge tubes (130A) in order to discharge liquid-state oil;

an impurity cooler (150B) having cooling tubes (151B) for cooling the impurities discharged through the impurity discharge tubes (130B);

a refined oil storing part (160A) for sorting and storing the liquid-state oils refined as refined oils after passing the oil cooler (150A);

an impurity storing part (160B) for sorting and storing the impurities discharged after passing the impurity cooler (150B); and Gas outlets (170A), which is connected to the oil cooler (150A) and separately discharges gas contained in the refined oils so that the gas can be recycled.

2. The pressure control type oil refining device according to claim 1, wherein the heating furnace (110) is an electric furnace, which uses electricity as a heat source, wherein the oil discharge tubes (130A) and the impurity discharge tubes (130B) are arranged to be inclined downwardly from the upper part so that the fluids are discharged easily, and five oil discharge tubes (130A) and five impurity discharge tubes (130B) are distributed, and wherein the first set of pressure valves (140A) and the second set of pressure valves (140B) are disposed to be operated differently depending on pressure because there is a difference in pressure values for opening and closing the valves, and are arranged at corresponding positions to be opposed to each other so as to provide the same opening and closing actions.

3. The pressure control type oil refining device according to claim 1, wherein the oil cooler (150A) has a temperature controller mounted therein to uniformly maintain temperature of the oil cooler.

* * * * *